United States Patent
Yamamoto et al.

(10) Patent No.: US 10,236,976 B2
(45) Date of Patent: Mar. 19, 2019

(54) LIGHTING DEVICE AND LIGHTING SYSTEM

(71) Applicant: PANASONIC INTELLECTUAL PROPERTY MANAGEMENT CO., LTD., Osaka (JP)

(72) Inventors: Tomokazu Yamamoto, Osaka (JP); Tatsumi Setomoto, Osaka (JP); Tamotsu Ando, Osaka (JP); Kohji Hiramatsu, Osaka (JP); Hajime Ozaki, Kyoto (JP); Kentaro Yamauchi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/895,558

(22) Filed: Feb. 13, 2018

(65) Prior Publication Data
US 2018/0248619 A1  Aug. 30, 2018

(30) Foreign Application Priority Data
Feb. 27, 2017 (JP) ................. 2017-035155

(51) Int. Cl.
*H04B 10/079* (2013.01)
*H04B 10/116* (2013.01)
(Continued)

(52) U.S. Cl.
CPC ......... *H04B 10/07953* (2013.01); *G08B 5/36* (2013.01); *G08C 23/04* (2013.01);
(Continued)

(58) Field of Classification Search
CPC ... H04B 10/07953; H04B 10/116; G08B 5/36
See application file for complete search history.

(56) References Cited

U.S. PATENT DOCUMENTS

| 8,350,479 B1 * | 1/2013 | Brazille, II | F21K 9/23 315/34 |
| 2013/0033178 A1 * | 2/2013 | Huang | H05B 37/0272 315/86 |

(Continued)

FOREIGN PATENT DOCUMENTS

| JP | 05-308365 A | 11/1993 |
| JP | 2003-151780 A | 5/2003 |

(Continued)

*Primary Examiner* — Nathan M Cors
(74) *Attorney, Agent, or Firm* — McDermott Will & Emery LLP

(57) ABSTRACT

A lighting device includes: a communication unit configured to wirelessly communicate with a wireless device provided externally; a command receiver that receives a command from outside; a light emitter including a light source; and a controller connected to the communication unit, the command receiver, and the light emitter. The command receiver receives a wireless device specifying command that specifies the wireless device with which the communication unit is to wirelessly communicate. The controller tests wireless communication with the wireless device via the communication unit based on the wireless device specifying command received, obtains communication reliability information regarding the reliability of the wireless communication, and causes the light emitter to perform at least one of flashing, dimming, and toning based on the communication reliability information obtained.

8 Claims, 12 Drawing Sheets

(51) Int. Cl.
    *H04W 24/04*     (2009.01)
    *G08B 5/36*     (2006.01)
    *G08C 23/04*     (2006.01)
    *H04B 10/114*     (2013.01)

(52) U.S. Cl.
    CPC ......... *H04B 10/114* (2013.01); *H04B 10/116* (2013.01); *H04W 24/04* (2013.01)

(56) References Cited

U.S. PATENT DOCUMENTS

| | | | |
|---|---|---|---|
| 2014/0368115 A1* | 12/2014 | Ando | H05B 37/0272 |
| | | | 315/129 |
| 2015/0173157 A1* | 6/2015 | Setomoto | H05B 37/0227 |
| | | | 315/153 |
| 2017/0047783 A1* | 2/2017 | Shevde | H02J 50/12 |

FOREIGN PATENT DOCUMENTS

| | | | |
|---|---|---|---|
| JP | 2004-303510 A | 10/2004 | |
| JP | 2014-241270 A | 12/2014 | |
| JP | 2016-091637 A | 5/2016 | |
| WO | 2016/067713 A1 | 5/2016 | |

\* cited by examiner

FIG. 8B (a) WHEN COMMUNICATION ESTABLISHMENT HAS BEEN MADE

START SIGN  SHOW THAT COMMUNICATION
ESTABLISHMENT HAS BEEN MADE
(CHANGE COLOR TEMPERATURE)

×M TIMES    END SIGN

NOTIFY MANAGEMENT
ADDRESS OF WIRELESS
CONTROLLER WITH
WHICH COMMUNICATION
ESTABLISHMENT HAS
BEEN MADE (b)
PROCEED TO MAKE COMMUNICATION
ESTABLISHMENT WITH ANOTHER LIGHTING DEVICE.
ALTERNATIVELY, SETTINGS OF PRESENT LIGHTING
DEVICE ARE RESET, AND COMMUNICATION
ESTABLISHMENT WITH PRESENT LIGHTING DEVICE
IS MADE.

LIGHTING DEVICE AND LIGHTING SYSTEM

CROSS REFERENCE TO RELATED APPLICATION

This application claims the benefit of priority of Japanese Patent Application Number 2017-035155 filed on Feb. 27, 2017, the entire content of which is hereby incorporated by reference.

BACKGROUND

1. Technical Field

The present disclosure relates to a lighting device and a lighting system including the lighting device.

2. Description of the Related Art

Conventionally, a lighting system including a plurality of lighting devices and a controller that wirelessly controls the plurality of lighting devices is known (see Japanese Unexamined Patent Application Publication No. 2014-241270 (Patent Literature (PTL) 1)). In order to determine the quality of wireless communication between the lighting devices and the controller, this lighting system notifies the communication quality by changing the light emission states of the lighting devices according to a result on a wireless communication quality test.

SUMMARY

The lighting system disclosed in PTL 1 collectively transmits test signals for testing the communication quality to all the lighting devices by radio, and notifies the communication quality by collectively changing the light emission states of all the lighting devices. Therefore, an installer who has installed the lighting devices merely obtains the test result in the form of the light emission states of the lighting devices, and remains unsure about whether the communication quality of each lighting device is actually secured. Moreover, the installer is not aware of how the communication quality was determined, and it may be difficult for the installer to determine what kind of countermeasures should be taken when the communication quality is poor.

In view of this, the present disclosure provides a lighting device and a lighting system capable of increasing a sense of ease and workability at the time of installation.

A lighting device according to an aspect of the present disclosure includes: a communication unit configured to wirelessly communicate with a wireless device provided externally; a command receiver that receives a command from outside; a light emitter including a light source; and a controller connected to the communication unit, the command receiver, and the light emitter. The command receiver receives a wireless device specifying command that specifies the wireless device with which the communication unit is to wirelessly communicate. The controller tests wireless communication with the wireless device via the communication unit based on the wireless device specifying command received, obtains communication reliability information regarding the reliability of the wireless communication, and causes the light emitter to perform at least one of flashing, dimming, and toning based on the communication reliability information obtained.

A lighting system according to an aspect of the present disclosure includes: a plurality of lighting devices each being the lighting device described above; a wireless device that wirelessly communicates with the communication unit of each of the plurality of lighting devices; and a setting device that transmits a command to the command receiver of each of the plurality of lighting devices.

A lighting device and a lighting system according to the present disclosure are capable of increasing a sense of ease and workability at the time of installation.

BRIEF DESCRIPTION OF DRAWINGS

The figures depict one or more implementations in accordance with the present teaching, by way of examples only, not by way of limitations. In the figures, like reference numerals refer to the same or similar elements.

Figure 5A:
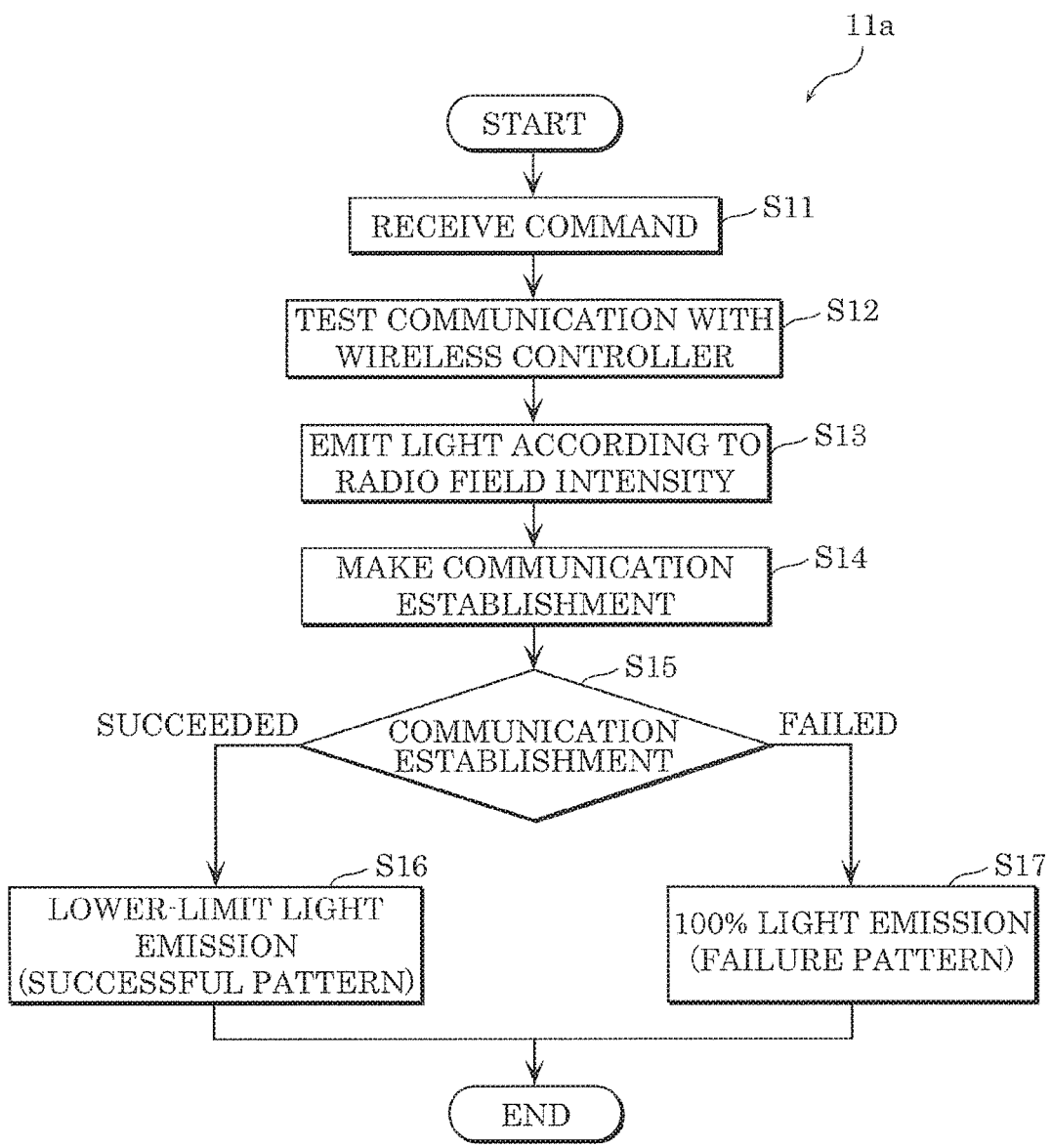
FIG. 5A is a flow chart illustrating a method for communication establishment with the lighting device according to Embodiment 1 (a pairing method)
Figure 5B:
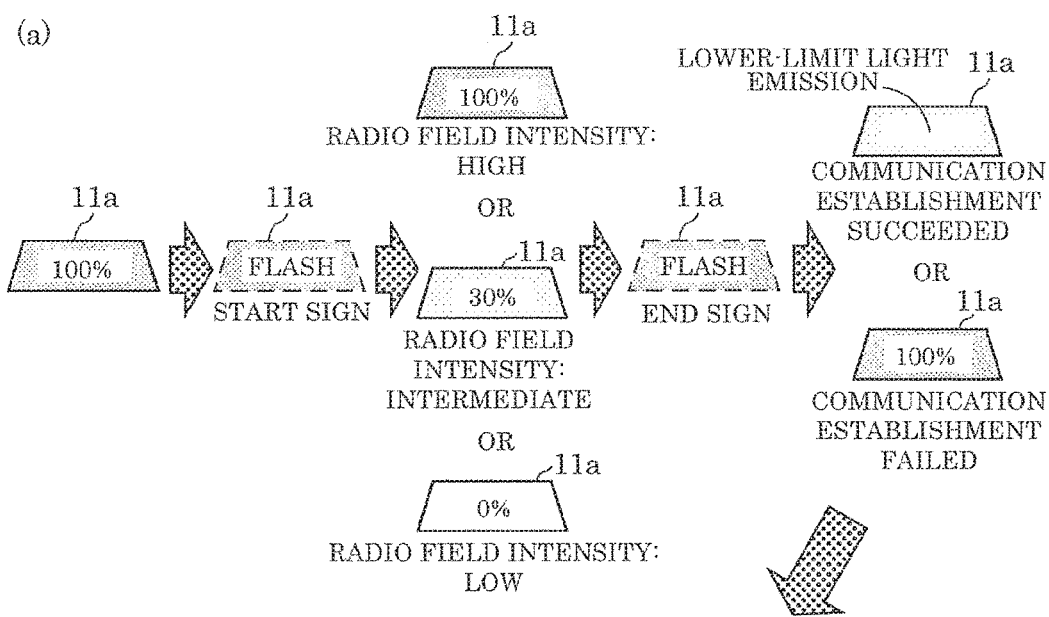
Figure 6A:
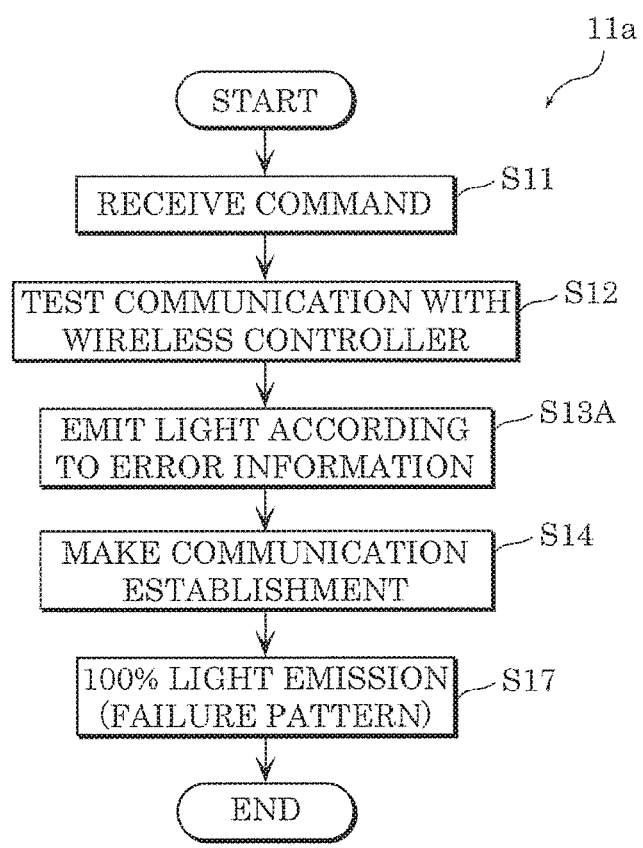
Figure 6B:
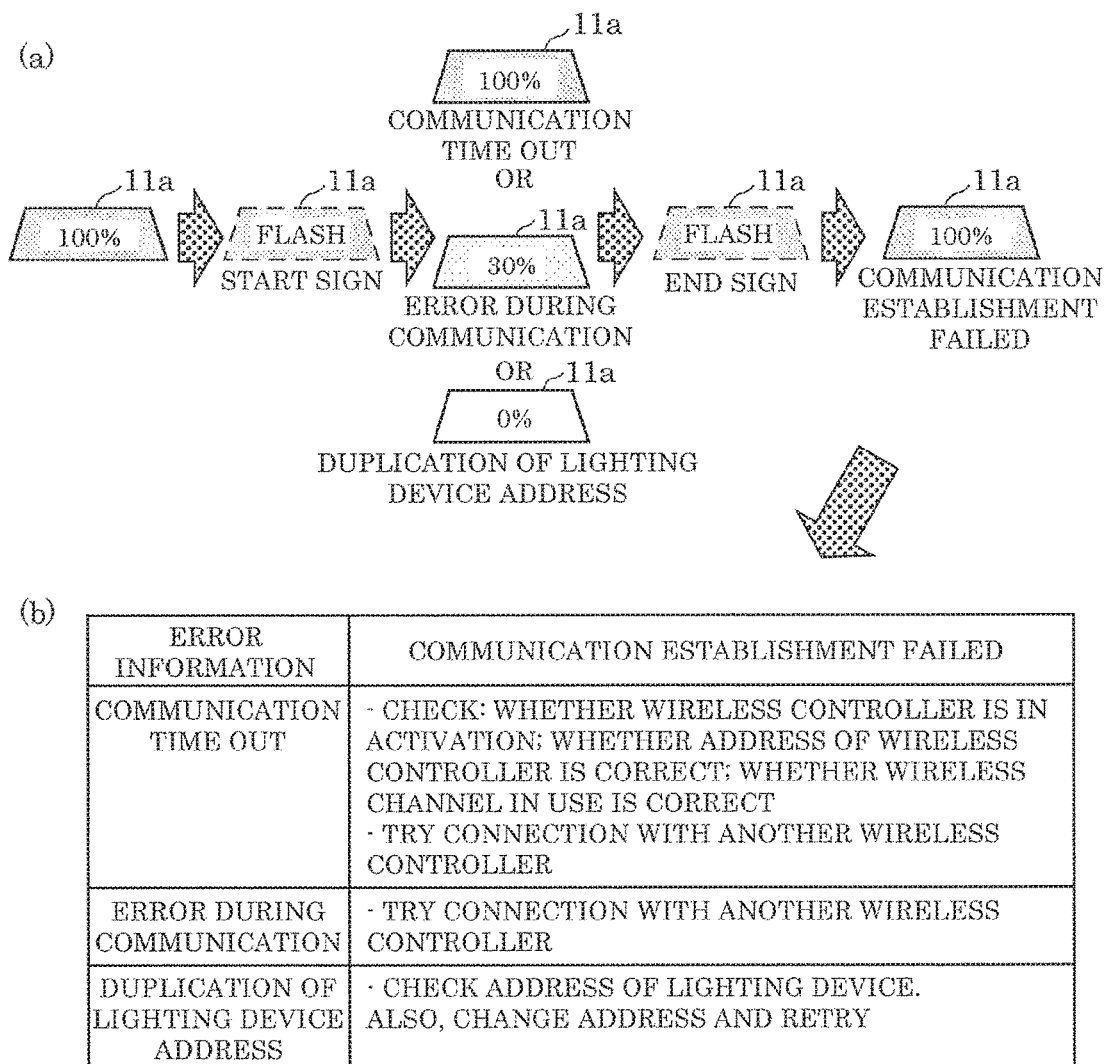
Figure 7A:
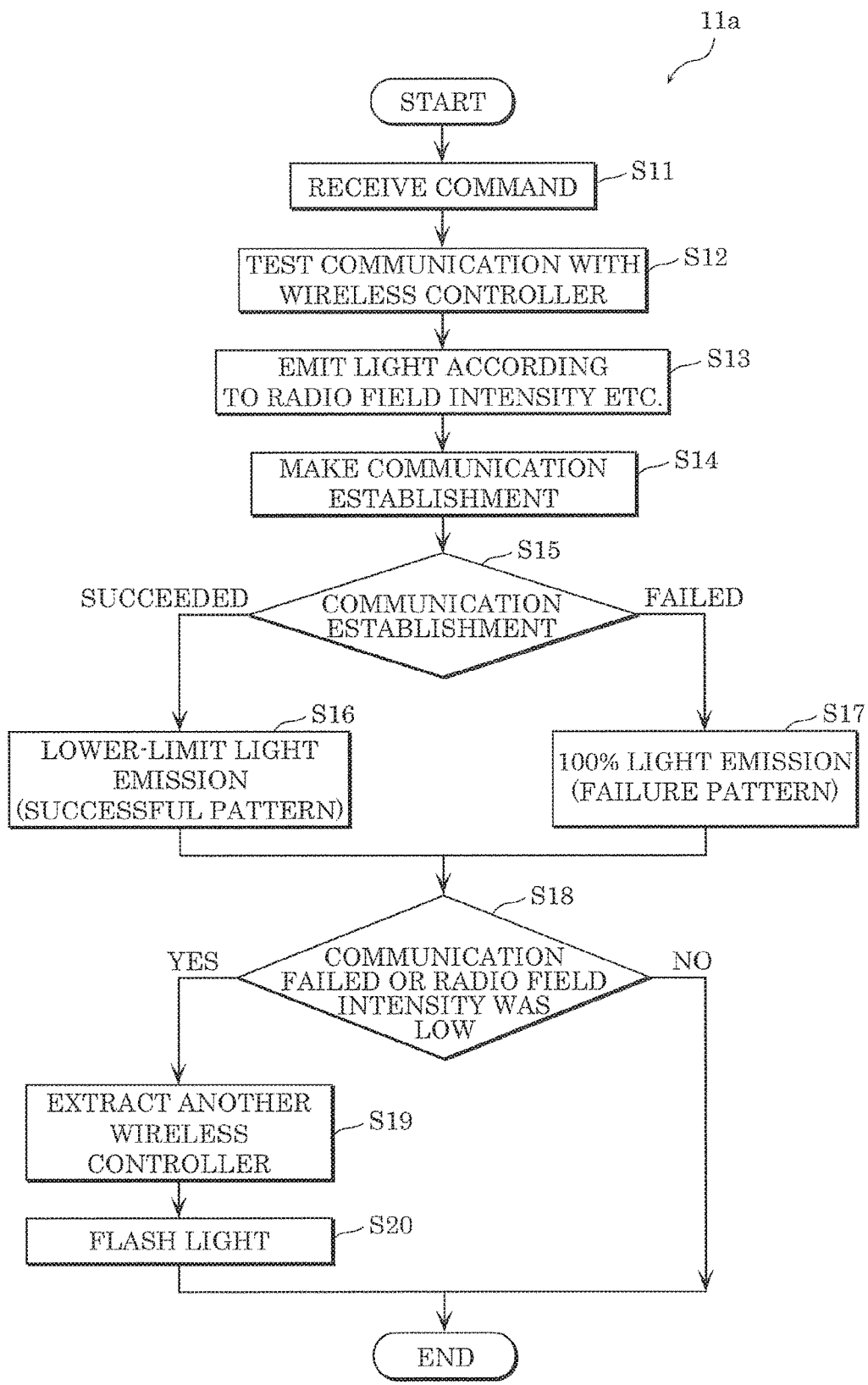
Figure 7B:
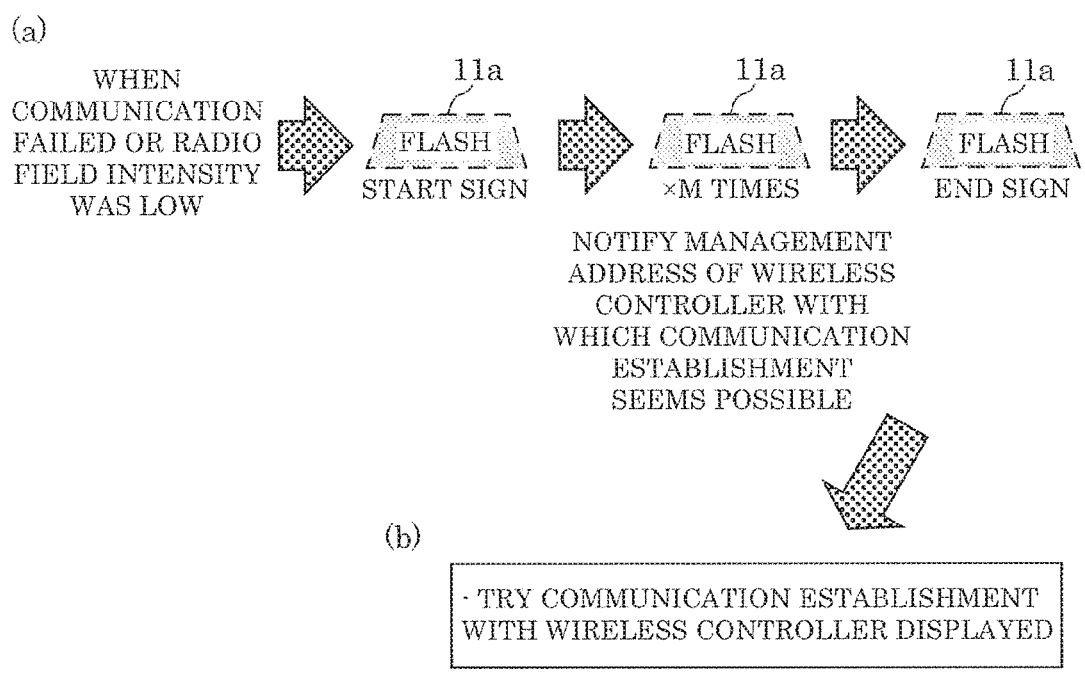
Figure 8A:
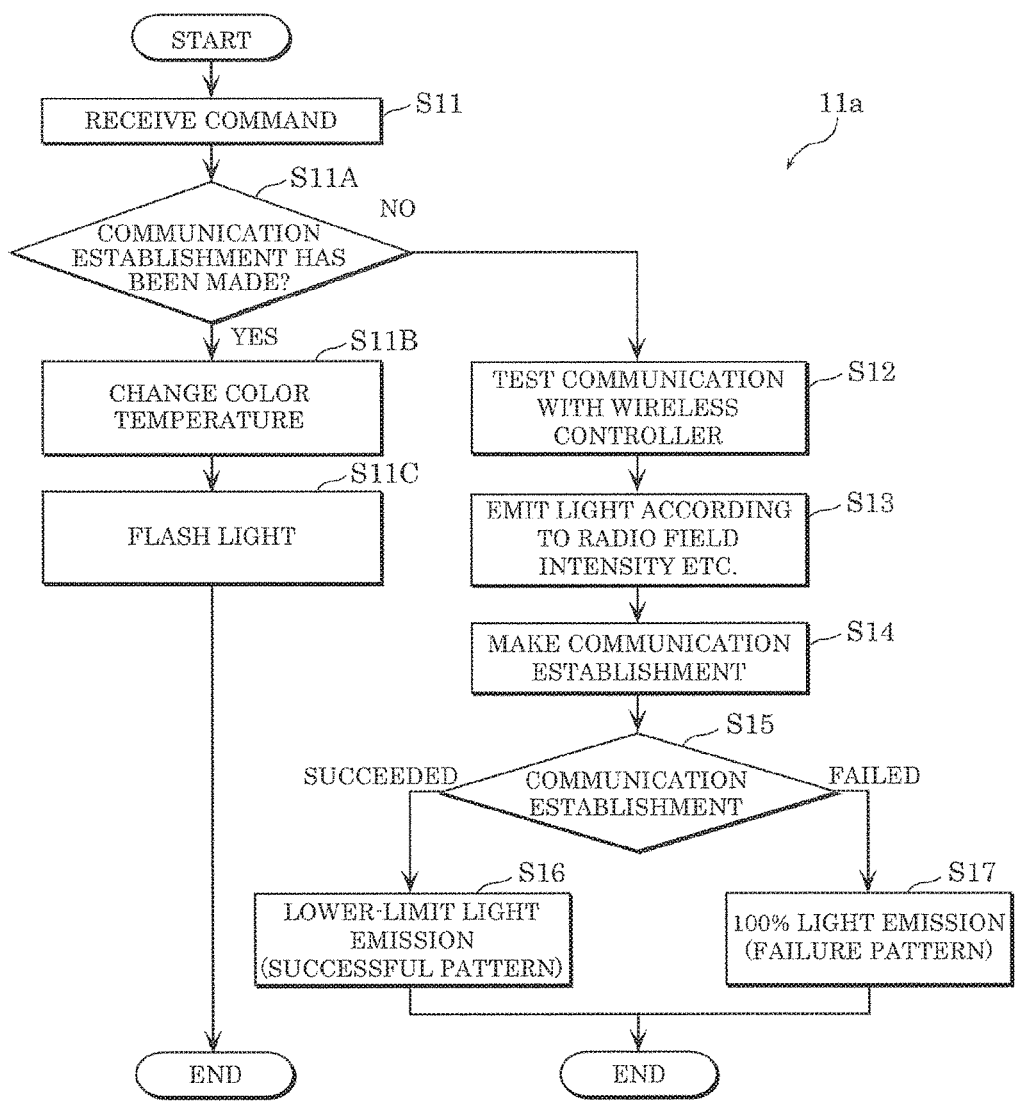
Figure 9A:
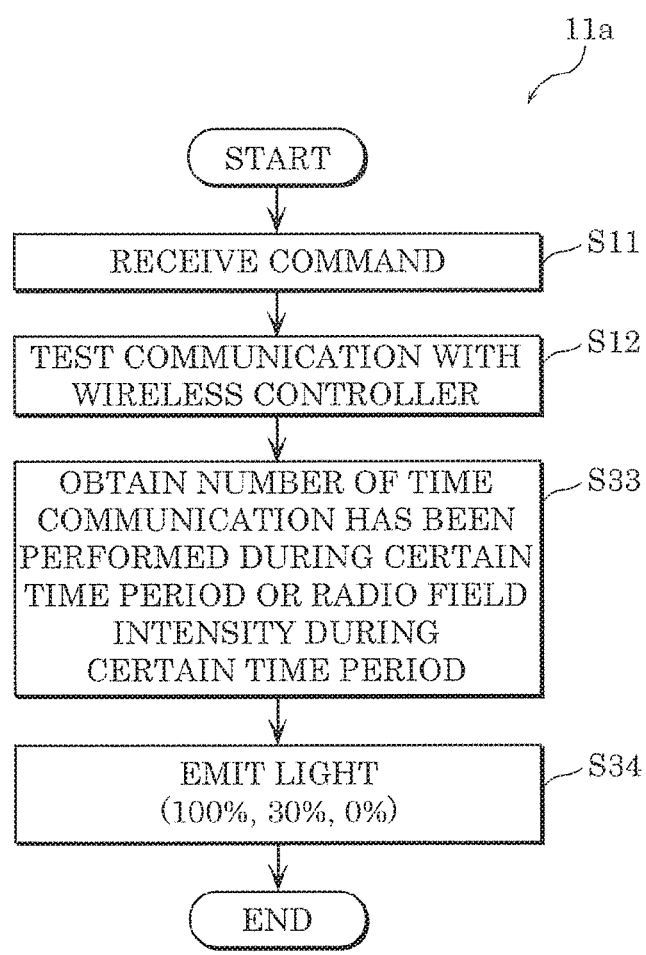
Figure 9B:
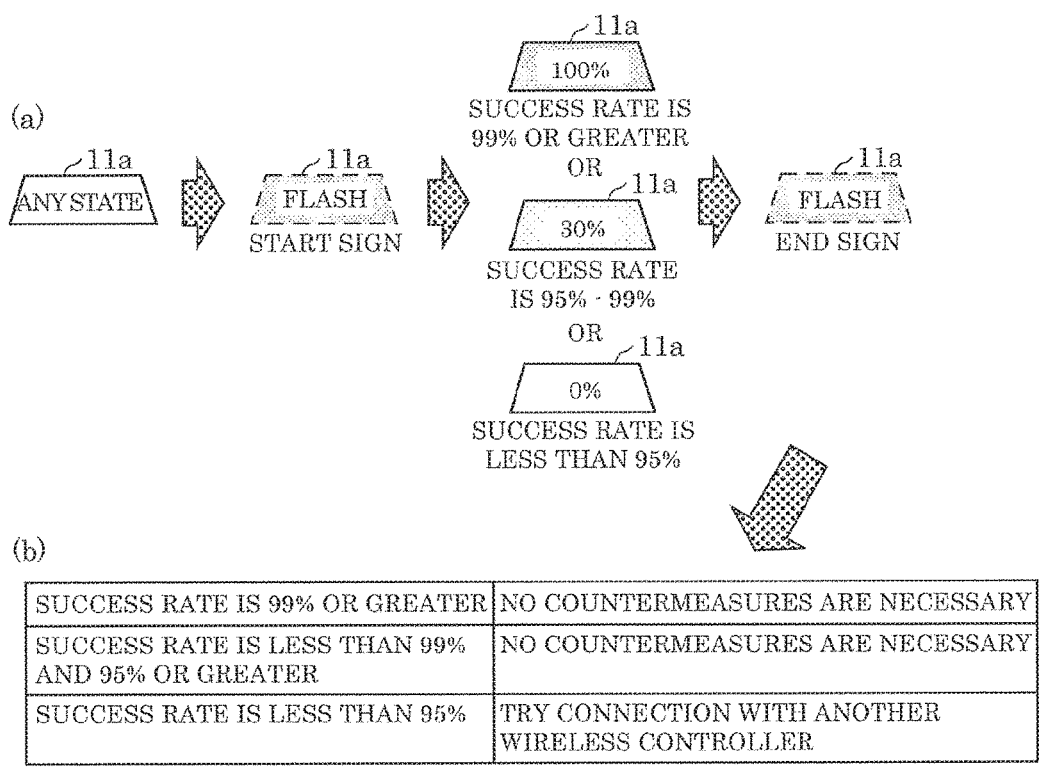

(a) of FIG. 5B illustrates communication establishment made with the lighting device according to Embodiment 1, and (b) of FIG. 5B illustrates actions following (a);

FIG. 6A is a flow chart illustrating a method for communication establishment with a lighting device according to Embodiment 2;

(a) of FIG. 6B illustrates communication establishment made with the lighting device according to Embodiment 2, and (b) of FIG. 6B illustrates actions following (a);

FIG. 7A is a flow chart regarding a lighting device according to Embodiment 3, and illustrates a method for handling a failure of communication establishment;

(a) of FIG. 7B is a flow chart regarding the lighting device according to Embodiment 3, and illustrates a method for handling a failure of communication establishment, and (b) of FIG. 7B illustrates an action following (a);

FIG. 8A is a flow chart illustrating a method for checking whether or not address setting has been made, according to Embodiment 4;

(a) of FIG. 8B illustrates the check on whether or not address setting has been made, according to Embodiment 4, and (b) of FIG. 8B illustrates an action following (a);

FIG. 9A is a flow chart illustrating a method for communication establishment with a lighting device according to Embodiment 5; and (a) of FIG. 9B illustrates communication establishment made with the lighting device according to Embodiment 5, and (b) of FIG. 9B illustrates actions following (a).

DETAILED DESCRIPTION OF THE EMBODIMENTS

Hereinafter, a lighting system and a lighting device according to embodiments will be described with reference to the drawings. Note that the embodiments described below illustrate specific examples of the present disclosure. Thus, the numerical values, shapes, materials, structural elements, the arrangement and connection of the structural elements, etc., presented in the embodiments below are mere examples and do not limit the present disclosure. As such, among the structural elements in the embodiments below, structural elements not recited in any one of the independent claims defining the most generic concepts of the present disclosure are described as optional structural elements.

Note also that each figure is a schematic illustration and not necessarily a precise illustration. Throughout the figures, the same reference signs are given to essentially the same structural elements, and redundant description is omitted or simplified.

(Embodiment 1)

[1-1. Configuration of Lighting System]

Figure 1:
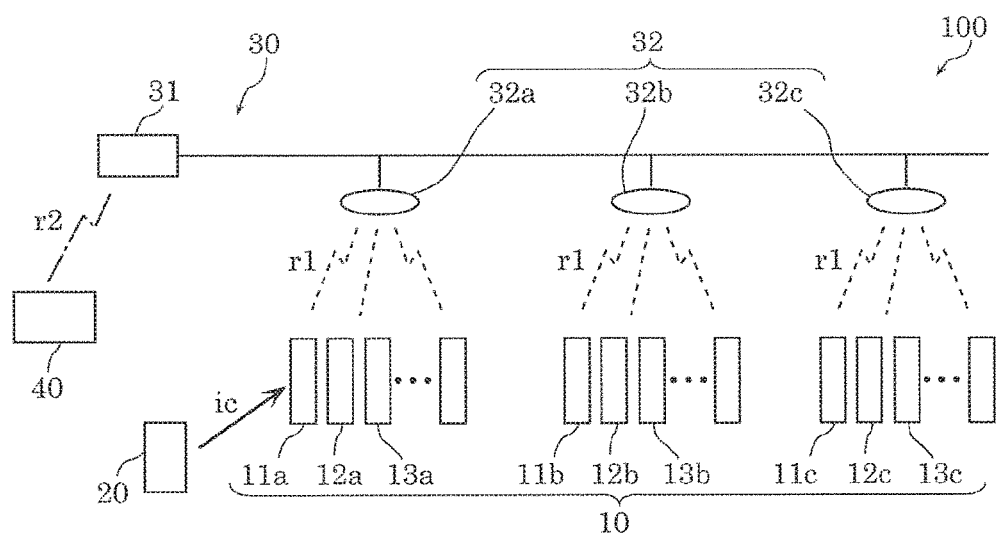
FIG. 1 is a schematic front view of a lighting system according to Embodiment 1.
Figure 2:
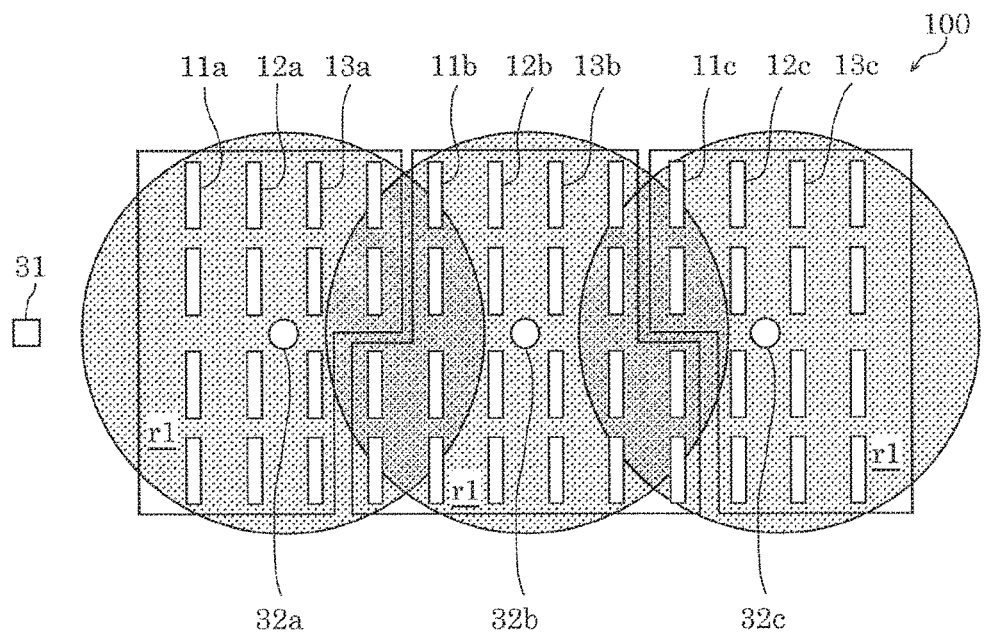
FIG. 2 is a plan view illustrating an example of the arrangement of lighting devices and wireless controllers included in the lighting system according to Embodiment 1.
Figure 3:
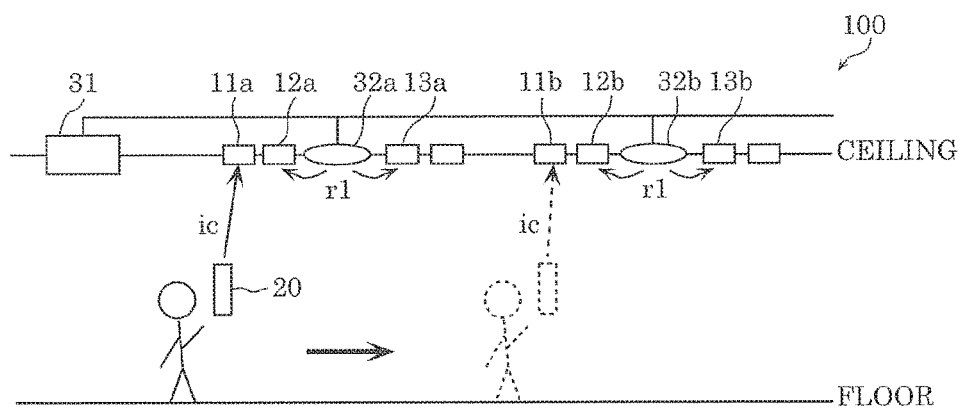
FIG. 3 illustrates how communication reliability information of the lighting devices and the wireless controllers according to Embodiment 1 is checked.

FIG. 1 is a schematic front view of lighting system 100 according to Embodiment 1. FIG. 2 is a plan view illustrating an example of the arrangement of lighting devices and wireless controllers included in lighting system 100 according to Embodiment 1. FIG. 3 illustrates how communication reliability information of the lighting devices and the wireless controllers included in lighting system 100 according to Embodiment 1 is checked.

Lighting system 100 includes a plurality of lighting devices 11a, 12a, 13a, 11b, 12b, 13b, 11c, 12c, and 13c, setting device 20, and lighting controller 30. Lighting controller 30 includes a plurality of wireless controllers (wireless devices) 32a, 32b, and 32c and upstream controller 31 that binds a plurality of wireless controllers 32a to 32c. Lighting system 100 also includes operation terminal 40 other than setting device 20.

Note that although FIG. 1 illustrates nine lighting devices 11a, 12a, 13a, 11b, 12b, 13b, 11c, 12c, and 13c, in reality, more than a hundred lighting devices may be installed in a construction material (a ceiling, for example) of a building. To correspond to such a great number of lighting devices, the number of wireless controllers 32a, 32b, and 32c may be four or greater. Hereinafter, lighting devices 11a, 12a, 13a, 11b, 12b, 13b, 11c, 12c, and 13c are also collectively called lighting devices 10. Wireless controllers 32a, 32b, and 32c are also collectively called wireless controllers 32.

First, a connection relationship among a plurality of lighting devices 10, setting device 20, and a plurality of wireless controllers 32 will be described.

As illustrated in FIG. 1 and FIG. 2, each of the plurality of lighting devices 11a, 12a, and 13a and wireless controller 32a are capable of communicating with each other by radio r1. A communication scheme such as specified low power radio using a frequency in the 920 MHz band or the 2.4 GHz band, Zigbee (registered trademark), Bluetooth (registered trademark), or WiFi (registered trademark) is used as a communication scheme using radio r1. The same is true for the relationship between lighting devices 11b, 12b, and 13b and wireless controller 32b and for the relationship between lighting devices 11c, 12c, and 13c and wireless controller 32c.

As illustrated in FIG. 3, each of the plurality of lighting devices 10 and setting device 20 are capable of communicating with each other via infrared ray communication ic having directivity. For example, when setting device 20 is located near lighting device 11a and transmits a signal to lighting device 11a via infrared ray communication ic, it is possible to transmit a command to targeted lighting device 11a only. Lighting devices 10 are installed in the ceiling at, for example, about 5-m intervals so that lighting devices 10 can individually receive an infrared ray signal from setting device 20. Note that the communication is not limited to infrared ray communication ic; a signal may be transmitted to lighting devices 10 individually using radio, such as laser light and near field communication (NFC), that enables one-to-one communication.

Operation terminal 40 is capable of communicating with upstream controller 31 via radio r2 such as WiFi (registered trademark). For upstream controller 31, operation terminal 40 makes settings regarding a lighting operation of lighting devices 10 performed when operating normally.

Hereinafter, respective configurations of lighting devices 10, setting device 20, and lighting controller 30 will be described.

[1-2. Configuration of Lighting Device]

Each lighting device 10 is, for example, a light-emitting diode (LED) light, and is installed in a construction material of a building such as housing. Note that lighting device 10 is not limited to the LED light, and may be a ceiling light. Hereinafter, among lighting devices 10, lighting device 11a will be described as a representative example.

Figure 4:
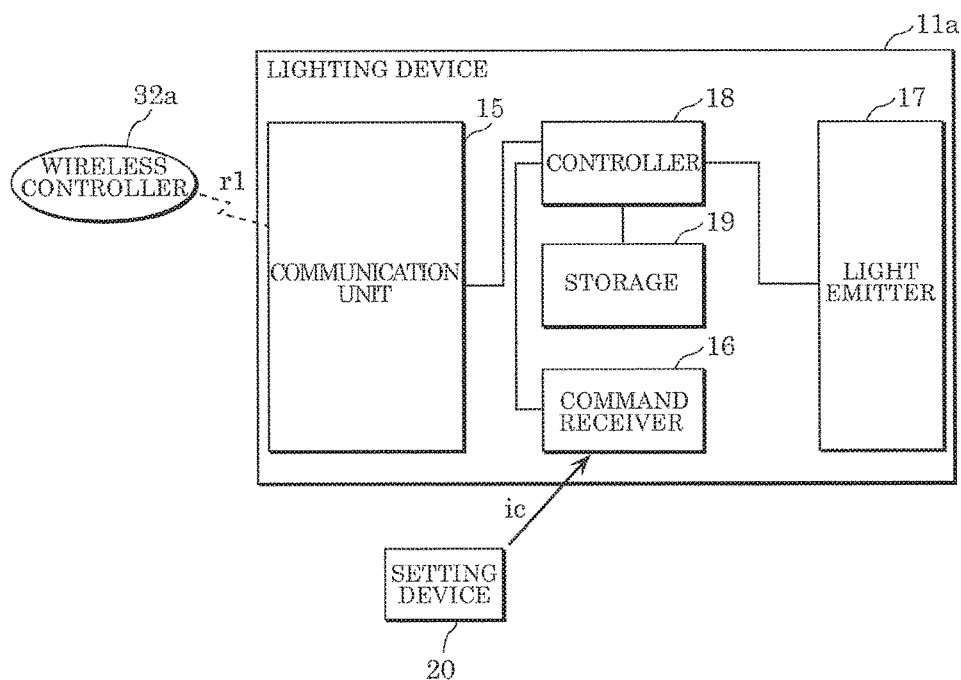
FIG. 4 is a block diagram illustrating a control configuration of a lighting device according to Embodiment 1.

FIG. 4 is a block diagram illustrating a control configuration of lighting device 11a.

Lighting device 11a includes: communication unit 15 that wirelessly communicates with wireless controller 32a provided externally; command receiver 16 that receives a command from outside; light emitter 17 including a light source; controller 18 connected with communication unit 15, command receiver 16, and light emitter 17; and storage 19 connected with controller 18.

Communication unit 15 includes an antenna and a wireless module, for example. As described above, communication unit 15 is capable of communicating with wireless controller 32a by radio r1.

Command receiver 16 is, for example, an infrared sensor, and receives a command transmitted via infrared ray communication ic. Using infrared ray communication ic having directivity allows command receiver 16 to receive a command individually from setting device 20, for example.

In the present embodiment, command receiver 16 receives from setting device 20 a wireless device specifying command that specifies which wireless controller 32 communication unit 15 is to wirelessly communicate with. The wireless device specifying command includes setting information regarding, for example, the media access control (MAC) address of wireless controller 32a, a channel to be used, and the management address (for example, a unique device identifier (UDID)) of lighting device 11a.

Light emitter 17 includes a plurality of light-emitting diodes that emit, for example, white light, red light, green light, or blue light. Light emitter 17 emits light in a predetermined light emission pattern (for example, flashing, dimming, toning, turning off the light, fading) based on communication reliability information regarding the reliability of wireless communication between communication unit 15 and wireless controller 32a. The communication reliability information is information regarding, for example, the magnitude of the radio field intensity, an error in the management address, an error in the channel in use, and an error in a total number of times communication is performed in a certain time period.

Controller 18 includes a central processing unit (CPU), and controls the operating state of light emitter 17. Controller 18 tests communication with wireless controller 32a specified via communication unit 15 based on the wireless device specifying command received. By testing the communication, controller 18 obtains communication reliability information of communication unit 15 and wireless controller 32a, and changes the light emission state of light emitter 17 based on the communication reliability information obtained. Controller 18 obtains the communication reliability information via communication unit 15.

Storage 19 includes random access memory (RAM) and read only memory (ROM), for example. Storage 19 stores predetermined light emission patterns (flashing, dimming, toning, turning off the light, fading) corresponding to the above communication reliability information. A certain light emission pattern based on the above communication reliability information is read out from storage 19 as necessary.

[1-3. Setting Device]

Setting device 20 is, for example, a simplified remote control (remote controller), and includes a transmitter such as an infrared ray LED. Setting device 20 transmits the wireless device specifying command to communication unit 15 of each lighting device 10 using infrared ray communication is that is unidirectional communication from setting device 20 to each lighting device 10. The wireless device specifying command includes setting information for making communication establishment (pairing) between certain lighting device 10 and certain wireless controller 32.

Further, setting device 20 may include a plurality of types of operation keys according to the communication reliability information to be obtained, e.g., an operation key for obtaining information regarding the radio field intensity, an operation key for obtaining information regarding an error in the management address or the channel in use, or an operation key for obtaining information regarding an error in a total number of times communication is performed in a certain time period.

[1-4. Lighting Controller]

Lighting controller 30 is a management server that manages the plurality of lighting devices 10. As illustrated in FIG. 1, lighting controller 30 includes upstream controller 31 and wireless controllers 32a, 32b, and 32c connected to upstream controller 31 via a cable.

Upstream controller 31 transmits a command that controls the operation of lighting devices 10, to lighting devices 10 via wireless controllers 32.

Wireless controllers 32 are wireless devices that communicate with lighting devices 10 by radio r1. The wireless devices may be wireless routers or wireless relay devices, or may be personal computers or mobile communication terminals.

In order for lighting devices 10 and wireless controllers 32 to identify each other and wirelessly communicate with each other, it is necessary to make communication establishment (pairing) between lighting devices 10 and wireless controllers 32 at the time of, for example, installation. Hereinafter, the communication establishment between lighting devices 10 and wireless controllers 32 will be described.

[1-5. Communication Establishment Between Lighting Devices and Wireless Controllers]

Next, communication establishment (pairing) between lighting devices 10 and wireless controllers 32 will be described. Hereinafter, a method for communication establishment with the lighting devices one by one will be described using lighting device 11a as a representative example.

FIG. 5A is a flow chart illustrating a method for communication establishment with lighting device 11a. (a) of FIG. 5B illustrates communication establishment made with lighting device 11a, and (b) of FIG. 5B illustrates actions following (a).

First, using setting device 20, the wireless device specifying command is transmitted to lighting device 11a that is emitting light at 100%. With this, lighting device 11a receives the wireless device specifying command (S11). The wireless device specifying command is, for example, a command indicating that lighting device 11a is to wirelessly communicate with wireless controller 32a in particular.

Lighting device 11a that has received the wireless device specifying command tests wireless communication with wireless controller 32a via communication unit 15 (S12). In the present embodiment, communication reliability information regarding the radio field intensity is obtained through the test of the wireless communication. After testing the wireless communication, lighting device 11a flashes. The flashing is a start sign indicating that the test of the wireless communication is finished and that the communication reliability information obtained is to be notified from now. With this start sign (flashing), the installer becomes visually aware that the communication reliability information of lighting device 11a and wireless controller 32a will be disclosed from now.

Next, as the first step, lighting device 11a changes the light emission state according to the communication reliability information that is a result of the test of the wireless communication (S13). Specifically, lighting device 11a expresses the magnitude of the radio field intensity of wireless controller 32a using three dimming levels. For example, lighting device 11a emits light at 100% when the radio field intensity is high, emits light at 30% when the radio field intensity is intermediate, and emits light at 0% (turns off the light) when the radio field intensity is low. This light emission state is maintained for several seconds, for example. Since the light emission state is maintained, the installer becomes visually aware of the magnitude of the radio field intensity between lighting device 11a and wireless controller 32a.

Having finished the light emission as the first step, lighting device 11a makes communication establishment with wireless controller 32a (S14). After making the communication establishment, lighting device 11a flashes. The flashing is an end sign indicating that the communication establishment is finished and that the result of the communication establishment is to be notified from now. With the end sign (flashing), the installer becomes visually aware that the result of the communication establishment between lighting device 11a and wireless controller 32a will be disclosed from now.

Next, controller 18 of lighting device 11a determines whether the communication establishment has succeeded or failed (S15). Then, as the second step, controller 18 changes the light emission state according to whether the communication establishment has succeeded or failed. Specifically, lighting device 11a performs lower-limit light emission, that is a successful pattern, when the communication establishment has succeeded (S16), and performs 100% light emission, that is a failure pattern, when the communication establishment has failed (S17). With the light emission state, the installer becomes visually aware of whether the communication establishment between lighting device 11a and wireless controller 32a has succeeded or failed. Note that lighting device 11a may be set in such a manner that lighting device 11a performs 100% light emission as the successful pattern and performs lower-limit light emission as the failure pattern.

Next, the installer takes the following actions (countermeasures) based on the light emission states of lighting device 11a so far.

For example, as illustrated in (b) of FIG. 5B, when the radio field intensity is high in S13 and the communication establishment has succeeded in S16, it is determined that the communication establishment between lighting device 11a and wireless controller 32a has finished without any problem. When the radio field intensity is intermediate in S13 and the communication establishment has succeeded in S16, it is also determined that there is no problem. However, when the radio field intensity is recognized as being weak in S13, an action will be taken because the communication is unstable, even if the communication establishment has succeeded in S16. Specifically, connection with another wireless controller (e.g., 32b) is tried. Alternatively, a relay device is provided between lighting device 11a and wireless controller 32a, or a new wireless controller is added.

Further, when, for example, the communication establishment has failed as in S17 even though the radio field intensity is high in S13, it is determined that there is a problem in a factor other than the radio wave environment, and an inquiry is made to the manufacturer of lighting device 11a and wireless controller 32a. Further, when the radio field intensity is intermediate in S13 and the communication establishment has failed as in S17, the same countermeasures as above are taken. Furthermore, when the radio field intensity is low in S13 and the communication establishment has failed in S17, it is determined that there is a problem with the radio wave environment, and connection with another controller (e.g., 32b) is tried. Alternatively, a relay device is provided, or a new wireless controller is added.

With these operations, the communication establishment between lighting device 11a and wireless controller 32a is finished. Subsequently, the communication establishment is made also for other lighting devices 10 one by one in the same manner.

According to this method for the communication establishment with lighting devices 10, it is possible to become visually aware of the radio wave state of the wireless communication in the processing from the test of the wireless communication to the communication establishment. This allows the installer to realize whether the radio wave states of lighting devices 10 are good or poor, and confidently take countermeasures for, for example, lighting device 10 and wireless controller 32 having a poor radio wave state. As a result, it is possible to increase a sense of ease and workability at the time of installation.

(Embodiment 2)

Next, communication establishment between lighting devices 10 and wireless controllers 32 according to Embodiment 2 will be described. Embodiment 2 is different from Embodiment 1 in that the communication reliability information is not the radio field intensity but error information regarding an error in communication.

FIG. 6A is a flow chart illustrating a method for communication establishment with lighting device 11a according to Embodiment 2. (a) of FIG. 6B illustrates communication establishment made with lighting device 11a, and (b) of FIG. 6B illustrates actions following (a).

First, lighting device 11a receives the wireless device specifying command (S11). Next, lighting device 11a tests wireless communication with wireless controller 32a via communication unit 15 (S12).

In the present embodiment, in Step S12, the communication reliability information is obtained regarding error information indicating that there is an error in wireless communication. Next, as the first step, lighting device 11a changes the light emission state according to the error information (S13A). Specifically, lighting device 11a expresses the error information using three dimming levels. For example, lighting device 11a emits light at 100% when the error is, for example, communication time out, emits light at 30% when the error is, for example, interference, and emits light at 0% (turns off the light) when the error is, for example, duplication of the management address of lighting device 11a. This light emission state is maintained for several seconds, for example. Since the light emission state is maintained, the installer becomes visually aware of the state of the error between lighting device 11a and wireless controller 32a. Note that the difference in the dimming level of lighting device 11a indicates, not the magnitude of the error, but a difference in the state of lighting device 11a.

Having finished the light emission as the first step, lighting device 11a makes communication establishment with wireless controller 32a (S14). After making the communication establishment, lighting device 11a flashes. The flashing is an end sign indicating that the result of the communication establishment is to be notified from now.

Next, controller 18 of lighting device 11a determines whether the communication establishment has succeeded or failed. In the present embodiment, the communication establishment has failed because the error information has already been obtained. In other words, lighting device 11a emits light at 100%, that is, a failure pattern (S17).

Next, the installer takes the following actions based on the light emission states of lighting device 11a so far.

For example, as illustrated in (b) of FIG. 6B, when it is recognized in S13A that the error is communication time out, the installer checks, for example, whether wireless controller 32a is in activation, whether the management address of wireless controller 32a is correct, and whether the channel in use is correct. When there is no problem with these check items, the installer tries connection with another controller (e.g., 32b) as specific countermeasures. When it is recognized in S13A that the error is, for example, interference, the installer tries connection with another controller (e.g., 32b). When it is recognized in S13A that the error is, for example, duplication of the management address of lighting device 11a, the installer checks the management address of lighting device 11a. If there is an error in the management address, the installer changes the management address and makes a retry.

With these operations, the communication establishment between lighting device 11a and wireless controller 32a is finished. Subsequently, the communication establishment is made also for other lighting devices 10 one by one in the same manner.

According to this method for the communication establishment with lighting devices 10, it is possible to become visually aware of the error state of the wireless communication in the processing from the test of the wireless communication to the communication establishment. This allows the installer to realize the error state of lighting device 10, and confidently take countermeasures for, for example, lighting device 10 and wireless controller 32 that are in the error state. As a result, it is possible to increase a sense of ease and workability at the time of installation.

(Embodiment 3)

Next, communication establishment between lighting devices 10 and wireless controllers 32 according to Embodiment 3 will be described. Embodiment 3 describes a method for handling a failure of the communication establishment in Embodiment 1 or 2.

FIG. 7A is a flow chart regarding lighting device 11a according to Embodiment 3, and illustrates a method for handling a failure of communication establishment. (a) of FIG. 7B illustrates a method for handling a failure of communication establishment, and (b) of FIG. 7B illustrates an action following (a).

First, Steps S11 to S17 are performed in the same manner as Embodiment 1. Next, like the items shown in (b) of FIG.

5B, it is determined whether the communication establishment has resulted in a failure or whether the radio field intensity was low (S18). When the communication establishment has not failed and the radio field intensity was not low (NO in S18), that is, when the communication establishment has been appropriately made, the processing flow is finished. On the other hand, when the communication establishment has failed or the radio field intensity was low (YES in S18), a try is made to see whether wireless communication can be performed with another wireless controller 32 (S19). Specifically, another wireless controller 32 whose radio field intensity is high or intermediate is searched for. After testing wireless communication with another wireless controller 32, lighting device 11a flashes. With the flashing of lighting device 11a, the installer becomes visually aware that the test of the wireless communication between lighting device 11a and another wireless controller 32 has finished. However, at this stage, the installer is not aware of which specific wireless controller 32 is another wireless controller 32.

In view of this, when lighting device 11a seems able to make communication establishment with another wireless controller 32, the management address (identification information) of another wireless controller 32 is notified based on a total number of times light emitter 17 flashes (S20). For example, when wireless controller 32b with which communication establishment seems possible has the management address "B", notification that communication establishment is possible with wireless controller 32b having the management address "B" is transmitted by causing light emitter 17 to flash twice, indicating the second letter of the alphabet. Based on the total number of times light emitter 17 flashes, the installer becomes visually aware of which wireless controller 32 lighting device 11a can make communication establishment with. After notifying the identification information of another wireless controller 32 with which communication establishment seems possible, lighting device 11a gives the end sign by flashing.

Next, as illustrated in (b) of FIG. 7B, the installer tries communication establishment with wireless controller 32b indicated by the total number of times lighting device 11a has flashed. With these operations, the communication establishment between lighting device 11a and wireless controller 32b is finished. Subsequently, the communication establishment is made also for other lighting devices 10 one by one in the same manner.

According to this method for the communication establishment with lighting devices 10, it is possible to become visually aware of another wireless controller 32 with which communication establishment is possible in the processing from the test of the wireless communication to the communication establishment. Thus, the installer can confidently make the communication establishment with another wireless controller 32. As a result, it is possible to increase a sense of ease and workability at the time of installation.

(Embodiment 4)

Next, communication establishment between lighting devices 10 and wireless controllers 32 according to Embodiment 4 will be described. Embodiment 4 describes the case where the communication establishment with lighting device 11a has already been made (the management address has already been set). The present embodiment is applied to, for example, the case where the installation work is performed over several days, the case where the installer has forgotten how far the setting work has been done, the case where the installer simply wants to know what settings have been made for lighting device 11a at hand, etc.

FIG. 8A is a flow chart illustrating a method for checking whether or not address setting has been made, according to Embodiment 4. (a) of FIG. 8B illustrates the check on whether or not the address setting has been made, and (b) of FIG. 8B illustrates an action following (a).

First, lighting device 11a in any state, e.g., emitting light at 100%, receives a check command regarding communication establishment (S11), and checks whether or not lighting device 11a has already made communication establishment with any one of wireless controllers 32 (S11A). Here, when lighting device 11a has not made communication establishment yet (NO in S11A), the processing proceeds to Steps S12 to S17 shown on the right hand side of FIG. 8A. Steps S12 to S17 are the same as in Embodiment 1, and thus the description thereof will not be repeated.

When lighting device 11a has already made communication establishment (YES in S11A), lighting device 11a notifies, in the form of the light emission state, that communication establishment has already been made (S11B). Specifically, when storage 19 of lighting device 11a has a record indicating that the communication establishment has been made with certain wireless controller 32, lighting device 11a notifies that the communication establishment has already been made, by changing the color temperature from 3000 K to 5000K. With the change in the color temperature, the installer becomes visually aware that lighting device 11a has already made the communication establishment with certain wireless controller 32. However, at this stage, the installer is not aware of which wireless controller 32 lighting device 11a has already made the communication establishment with.

In view of this, lighting device 11a notifies the management address of wireless controller 32 with which lighting device 11a has already made the communication establishment, by the total number of times light emitter 17 flashes (S11C). For example, when the management address of wireless controller 32a with which lighting device 11a has already made the communication establishment is "A", lighting device 11a causes light emitter 17 to flash once, indicating the first letter of the alphabet. With this, lighting device 11a notifies that the communication establishment has already been made with wireless controller 32a having the management address "A". Based on the total number of times light emitter 17 flashes, the installer becomes visually aware of with which wireless controller 32 lighting device 11a has already made the communication establishment. Alternatively, after notifying the identification information of another wireless controller 32 with which communication establishment seems possible, lighting device 11a gives the end sign by flashing.

Since lighting device 11a has already made the communication establishment, the installer proceeds to an action of making communication establishment with another lighting device 10 as illustrated in (b) of FIG. 8B. Alternatively, the settings of lighting device 11a may be reset, and communication establishment with lighting device 11a may be made again.

In such a manner, command receiver 16 of lighting device 11a according to the present embodiment receives the check command regarding the communication establishment, and controller 18 checks, based on the check command received, whether or not controller 18 has already made the communication establishment with any one of wireless controllers 32, and controller 18 then causes light emitter 17 to perform at least one of flashing, dimming, and toning, based on the obtained information regarding the communication establishment.

According to this method for the communication establishment with lighting devices 10, it is possible to become visually aware of whether or not the communication establishment has already been made with lighting devices 10. This allows the installer to realize whether or not the communication establishment with lighting devices 10 has been made, and confidently take the next action for lighting device 10 with which the communication establishment has not been made. As a result, it is possible to increase a sense of ease and workability at the time of installation.

(Embodiment 5)

Next, communication establishment between lighting devices 10 and wireless controllers 32 according to Embodiment 5 will be described. Embodiment 5 is different from Embodiment 1 in that, rather than the communication reliability information for an instant situation, the communication reliability information for a certain time period is obtained. The present embodiment is applied when, for example, lighting system 100 is in a test operation after being installed.

FIG. 9A is a flow chart illustrating a method for communication establishment with lighting device 11a according to Embodiment 5. (a) of FIG. 9B illustrates communication establishment made with lighting device 11a, and (b) of FIG. 9B illustrates actions following (a).

First, lighting device 11a receives the wireless device specifying command (S11). Next, lighting device 11a tests wireless communication with wireless controller 32a via communication unit 15 (S12).

In the present embodiment, in Step S12, the communication reliability information is obtained which is (i) information regarding whether or not communication performed for a certain number of times during a certain time period has succeeded or (ii) information regarding the radio field intensity during a certain time period (S33). For example, a certain number of times communication is performed during a certain time period is a total number of times a predetermined amount of information is transferred during a certain time period, and the radio field intensity during a certain time period is an average of the radio field intensity during a certain time period.

After such communication reliability information is obtained, lighting device 11a changes the light emission state according to the information regarding whether or not the communication has succeeded or the information regarding the radio field intensity (S34). Specifically, lighting device 11a expresses the communication reliability information using three dimming levels. For example, lighting device 11a emits light at 100% when the communication success rate is 99% or greater, emits light at 30% when the communication success rate is less than 99% and greater than or equal to 95%, and emits light at 0% (turns off the light) when the communication success rate is less than 95%. This light emission state is maintained for several seconds, for example. Since the light emission state is maintained, the installer visually becomes aware of the success rate of the communication between lighting device 11a and wireless controller 32a. After notifying the information regarding the communication success rate, lighting device 11a gives the end sign by flashing.

Next, the installer takes the following actions based on the light emission state of lighting device 11a.

For example, as illustrated in (b) of FIG. 9B, when the communication success rate is recognized as 99% or greater in S33, no countermeasures are necessary. Likewise, also when the communication success rate is recognized as less than 99% and greater than or equal to 95% in S33, no countermeasures are necessary. However, when the communication success rate is recognized as less than 95% in S33, connection with another wireless controller 32 is tried.

With these operations, the communication establishment between lighting device 11a and wireless controller 32a is finished. Subsequently, the communication establishment is made also for other lighting devices 10 one by one in the same manner.

According to this method for the communication establishment with lighting devices 10, it is possible to become visually aware of the success rate of communication between lighting devices 10 and wireless controllers 32 during a certain time period, rather than at an instant situation. This allows the installer to realize the communication success rate of lighting devices 10, and confidently take countermeasures for, for example, lighting device 10 and wireless controller 32 having a low communication success rate. As a result, it is possible to increase a sense of ease and workability at the time of installation.

(Advantageous Effects, Etc.)

Lighting device 10 according to the present embodiment includes: communication unit 15 configured to wirelessly communicate with wireless controller (wireless device) 32 provided externally; command receiver 16 that receives a command from outside; light emitter 17 including a light source; and controller 18 connected to communication unit 15, command receiver 16, and light emitter 17. Command receiver 16 receives a wireless device specifying command that specifies wireless controller 32 with which communication unit 15 is to wirelessly communicate. Controller 18 tests wireless communication with wireless controller 32 via communication unit 15 based on the wireless device specifying command received, obtains communication reliability information regarding the reliability of the wireless communication, and causes light emitter 17 to perform at least one of flashing, dimming, and toning based on the communication reliability information obtained.

According to this configuration, it is possible to become visually aware of the wireless communication state from the test of the wireless communication to the obtainment of the communication reliability information. This allows the installer to realize whether the wireless communication states of lighting devices 10 are good or poor, and confidently take the next action for, for example, lighting device 10 having a poor wireless communication state. As a result, it is possible to increase a sense of ease and workability at the time of installation.

The communication reliability information may be the radio field intensity of radio waves received by communication unit 15, and controller 18 may cause light emitter 17 to perform at least one of flashing, dimming, and toning in a plurality of predetermined light emission patterns based on the magnitude of the radio field intensity.

According to this configuration, it is possible to become visually aware of the radio field intensity from the test of the wireless communication to the obtainment of the communication reliability information regarding the radio field intensity. This allows the installer to realize whether the radio field intensities of lighting devices 10 are good or poor, and confidently take the next action for, for example, lighting device 10 having a poor radio field intensity. As a result, it is possible to increase a sense of ease and workability at the time of installation.

The communication reliability information may be error information obtained via communication unit 15, and controller 18 may cause light emitter 17 to perform at least one of flashing, dimming, and toning in a plurality of predetermined light emission patterns based on the error information.

According to this configuration, it is possible to become visually aware of whether or not there is an error in the wireless communication from the test of the wireless communication to the obtainment of the communication reliability information regarding the error information. This allows the installer to realize whether or not there is an error in lighting devices 10, and confidently take the next action for, for example, lighting device 10 having an error. As a result, it is possible to increase a sense of ease and workability at the time of installation.

When the reliability of the wireless communication indicated by the communication reliability information is lower than a predetermined reference level, controller 18 may extract another wireless controller (e.g., 32b) different from the wireless controller (e.g., 32a) specified by the wireless device specifying command, and notify identification information of another wireless controller 32b by a total number of times light emitter 17 flashes.

According to this configuration, it is possible to become visually aware of another wireless controller 32 with which communication establishment is possible. Thus, the installer can confidently make communication establishment with another wireless controller 32. As a result, it is possible to increase a sense of ease and workability at the time of installation.

Lighting device 10 may further include storage 19 that stores information specifying wireless controller 32 with which communication establishment has been made. Controller 18 may cause light emitter 17 to perform at least one of flashing, dimming, and toning according to whether or not storage 19 has the information specifying wireless controller 32 with which the communication establishment has been made.

According to this configuration, it is possible to become visually aware of whether or not the communication establishment with lighting devices 10 has already been made. This allows the installer to realize whether or not the communication establishment with lighting devices 10 has been made, and, confidently take the next action for lighting device 10 with which the communication establishment has not been made. As a result, it is possible to increase a sense of ease and workability at the time of installation.

The communication reliability information may be: information regarding whether or not communication performed for a certain number of times during a certain time period has succeeded; or information regarding the radio field intensity during a certain time period, and controller 18 may store in storage 19 at least one of: the information regarding whether or not communication performed for a certain number of times during a certain time period has succeeded; and the information regarding the radio field intensity.

According to this configuration, it is possible to become visually aware of the wireless communication state in a certain time period. This allows the installer to realize whether the wireless communication states of lighting devices 10 are good or poor, and confidently take the next action for, for example, lighting device 10 having a poor wireless communication state. As a result, it is possible to increase a sense of ease and workability at the time of installation.

Command receiver 16 may include an infrared sensor, and the wireless device specifying command may be received by command receiver 16 using infrared ray communication.

As described above, by using the infrared ray communication having directivity, lighting devices 10 can individually receive the wireless device specifying command. This makes it possible to reliably make the communication establishment with lighting devices 10 one by one. According to the lighting system disclosed in PTL 1, a test signal is wirelessly transmitted, and thus, the test itself may not be accurately performed if the quality of wireless communication is poor. In contrast, according to the present embodiment, the use of the infrared ray communication makes it possible to reliably receive the wireless device specifying command and test the wireless communication.

Lighting system 100 according to the present embodiment includes: a plurality of lighting devices 10 each being the lighting device described above; wireless controller (wireless device) 32 that wirelessly communicates with communication unit 15 of each of the plurality of lighting devices 10; and setting device 20 that transmits a command to command receiver 16 of each of the plurality of lighting devices 10.

According to this configuration, it is possible to become visually aware of the wireless communication state from the reception of the wireless device specifying command from setting device 20 and the test of the wireless communication to the obtainment of the communication reliability information. This allows the installer to realize whether the wireless communication states of lighting devices 10 and wireless controllers 32 are good or poor, and confidently take the next action for, for example, lighting device 10 having a poor wireless communication state. As a result, it is possible to increase a sense of ease and workability at the time of installation.

(Other Embodiments)

While the foregoing has described one or more embodiments and/or other examples of lighting device 10 and lighting system 100, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:
1. A lighting device, comprising:
a communication unit configured to wirelessly communicate with a wireless device provided externally;
a command receiver that receives a command from outside;
a light emitter including a light source; and
a controller connected to the communication unit, the command receiver, and the light emitter,
wherein the command receiver receives a wireless device specifying command that specifies the wireless device with which the communication unit is to wirelessly communicate, and
the controller:
tests wireless communication with the wireless device via the communication unit based on the wireless device specifying command received, obtains communication reliability information regarding reliability of the wireless communication;
provides a first sign using the light emitter, after obtaining the communication reliability information;

causes the light emitter to perform at least one of flashing, dimming, and toning based on the communication reliability information obtained after giving the first sign;

provides a second sign using the light emitter, after causing the light emitter to perform the at least one of flashing, dimming, and toning; and notifies, using the light emitter, whether communication establishment with the wireless device has succeeded or failed, after giving the second sign.

2. The lighting device according to claim 1, wherein
the communication reliability information is a radio field intensity of radio waves received by the communication unit, and the controller causes the light emitter to perform the at least one of flashing, dimming, and toning in a plurality of predetermined light emission patterns based on a magnitude of the radio field intensity.

3. The lighting device according to claim 1, wherein
the communication reliability information is error information obtained via the communication unit, and the controller causes the light emitter to perform the at least one of flashing, dimming, and toning in a plurality of predetermined light emission patterns based on the error information.

4. The lighting device according to claim 1, wherein
the command receiver includes an infrared sensor, and
the wireless device specifying command is received by the command receiver using infrared ray communication.

5. A lighting system, comprising:
a plurality of lighting devices each being the lighting device according to claim 1;
a wireless device that wirelessly communicates with the communication unit of each of the plurality of lighting devices; and
a setting device that transmits a command to the command receiver of each of the plurality of lighting devices.

6. A lighting device, comprising:
a communication unit configured to wirelessly communicate with a wireless device provided externally;
a command receiver that receives a command from outside;
a light emitter including a light source; and
a controller connected to the communication unit, the command receiver, and the light emitter,
wherein the command receiver receives a wireless device specifying command that specifies the wireless device with which the communication unit is to wirelessly communicate,
the controller tests wireless communication with the wireless device via the communication unit based on the wireless device specifying command received, obtains communication reliability information regarding reliability of the wireless communication, and causes the light emitter to perform at least one of flashing, dimming, and toning based on the communication reliability information obtained, and when the reliability of the wireless communication indicated by the communication reliability information is lower than a predetermined reference level,
the controller extracts an other wireless device different from the wireless device specified by the wireless device specifying command, and notifies identification information of the other wireless device by a total number of times the light emitter flashes.

7. A lighting device, comprising:
a communication unit configured to wirelessly communicate with a wireless device provided externally;
a command receiver that receives a command from outside;
a light emitter including a light source; and
a controller connected to the communication unit, the command receiver, and the light emitter,
wherein the command receiver receives a wireless device specifying command that specifies the wireless device with which the communication unit is to wirelessly communicate, and
the controller tests wireless communication with the wireless device via the communication unit based on the wireless device specifying command received, obtains communication reliability information regarding reliability of the wireless communication, and causes the light emitter to perform at least one of flashing, dimming, and toning based on the communication reliability information obtained,
the lighting device further comprises a storage that stores information specifying the wireless device with which communication establishment has been made, and
the controller causes the light emitter to perform at least one of flashing, dimming, and toning according to whether or not the storage has the information specifying the wireless device with which communication establishment has been made.

8. The lighting device according to claim 7, wherein
the communication reliability information is: information regarding whether or not communication performed for a certain number of times during a certain time period has succeeded; or information regarding a radio field intensity during a certain time period, and
the controller stores in the storage at least one of: the information regarding whether or not communication performed for a certain number of times during a certain time period has succeeded; and the information regarding the radio field intensity.

* * * * *